Patented May 9, 1933

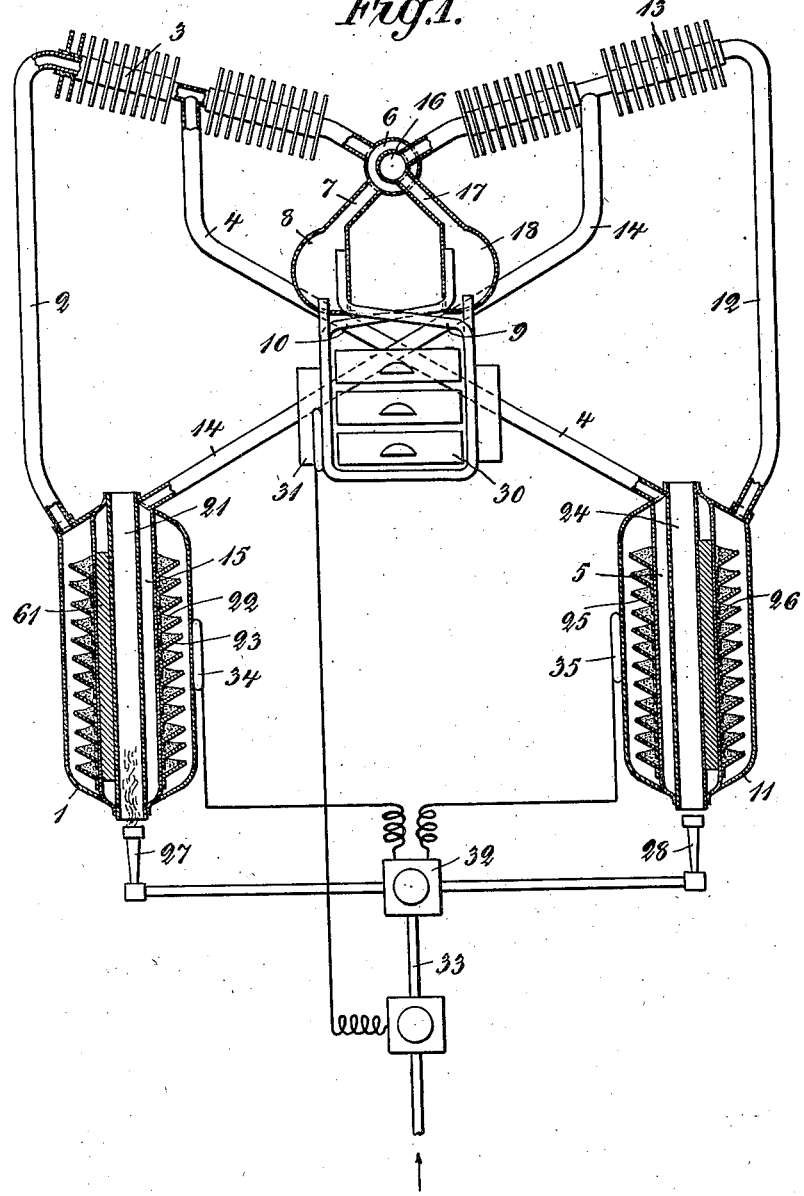

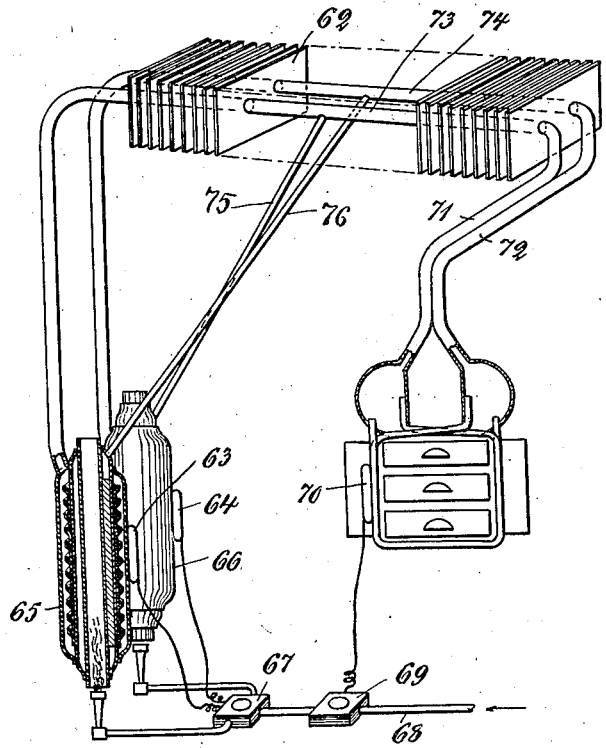
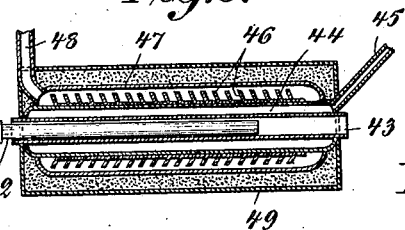
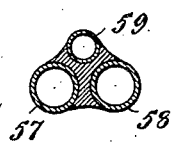
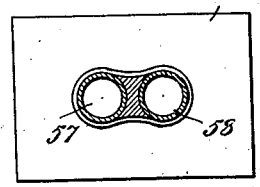

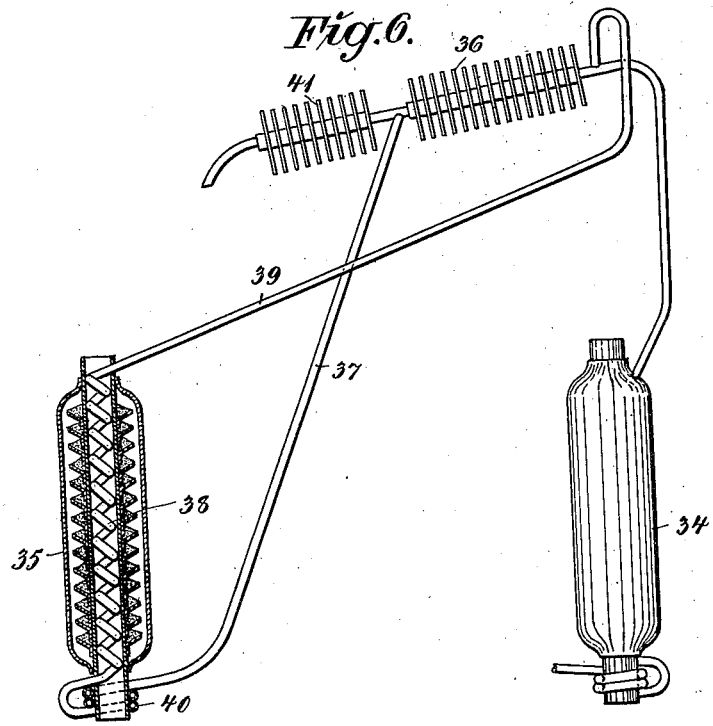

1,908,413

UNITED STATES PATENT OFFICE

THORE MARTIN ELFVING, OF STOCKHOLM, SWEDEN

ABSORPTION REFRIGERATING APPARATUS

Application filed January 28, 1932, Serial No. 589,479, and in Germany February 7, 1931.

The present invention relates to absorption refrigerating apparatuses, and has for its object a novel apparatus having a semi-continuous cooling effect and a high efficiency, even when air-cooled. It is of a simple construction and has no moving parts or valves and no complicated regulating means.

In previous continuous absorption refrigerating apparatuses without moving parts there exist considerable rectifier losses, particularly in air-cooled apparatuses, while at the same time the losses in the evaporator on account of high condenser and absorber temperatures are great. Said losses can only partially be eliminated by using a temperature exchanger. Great difficulties are encountered in air-cooled apparatuses also on account of corrosion due to the fact that aqueous solutions in combination with high boiler temperatures must be used and that the heat supplied to the boiler has to be concentrated to certain parts of the boiler for obtaining the desired thermo-syphon effect.

Hitherto known continuous air cooled apparatuses of absorption type have therefore a low efficiency while at the same time reliability is reduced by the above mentioned risk for corrosion. Such apparatuses will further on account of the great rectifier losses and the low efficiency require much greater cooling surfaces in relation to the delivered cooling effect than in apparatuses of the compressor type.

In units of the intermittent type the rectifier losses are eleminated by using solid absorption or adsorption means, so that a considerably higher efficiency is obtained while at the same time corrosion within the apparatus is entirely eliminated. Furthermore, there is no need for narrow tubes for concentrating the heating to certain points. Apparatuses of the intermittent type present, however, great inconveniences due to the fact that a continuous cooling effect can not be obtained. The intermittent operation requires very complicated regulating means as the boiler-absorber must be alternately heated and cooled, which in hitherto known apparatuses results in unsatisfactory dispositions both in regard to the insulation of the boiler and the cooling arrangements. In an air-cooled intermittent apparatus the boiler can not be insulated if it is desired to obtain a reasonable cooling effect during the absorption period. Hereby the heat losses during the boiling period will be very great which reduces the efficiency to an impractical degree.

To obtain a continuous cooling effect it has been proposed to build together two or more apparatuses of the intermittent type. In hitherto known arrangements this has involved a further complication of the regulating means for the apparatus whereby such combinations are of little commercial interest.

The present invention has for its object a refrigerating apparatus delivering a semi-continuous cooling effect while avoiding all of the above mentioned inconveniences in hitherto known apparatus both of the continuous and the intermittent type. More particularly the invention has for its object an absorption apparatus preferably having a solid absorption or adsorption substance and delivering a semi-continuous cooling effect by using two cooling systems operating intermittently and separated from, but depending upon, each other. The cooling period of the one system coincides with the boiling period of the other system and the one system during its boiling period automatically cools the boiler absorber in the other system during the simultaneous cooling period of the latter system and vice versa. Both systems operate preferably with the same cold radiating system which will thus deliver an almost continuous cooling effect. The cooling systems constitute each a hermetically closed system which systems, however, are mutually so dependent that the cooling periods will positively follow immediately upon each other. The systems can never operate out of time and they are interdependent in such a manner that the cooling period of the one system always presupposes a boiling period in the other system.

The invention has further for its object to reduce the efficiency losses as far as possible by letting the cooling medium vapors belonging to the one system during its cooling period precool condensate in the other system which condensate is stored in a container communicating with the evaporator.

Through the invention absorption refrigerating apparatus with small radiation losses is obtained, depending upon the fact that the boiler-absorber can be efficiently insulated and that an efficient cooling of the absorption material during the absorption period may be effected without letting the entire mass of the absorber participate in this temperature change. A refrigerating unit according to the invention will thus comply with all the requirements for an air cooled continuously operating unit, i. e. 1/ no moving parts, no valves, and no complicated regulating means 2/ no rectifier losses and very small radiation and condensate losses, which result in high efficiency and small cooling surfaces 3/ no internal corrosion as there is no aqueous solution present.

The invention will be more closely described in conjunction with the accompanying drawings in which Figure 1 shows an embodiment of a unit which is air cooled. Figure 2 shows a modification of the embodiment shown in Figure 1. Figures 3, 4 and 5 show details. Figure 6 shows a modified detail of the apparatus shown in Figures 1 and 2.

The unit shown in Figure 1 consists of two separated but interdependent, intermittent absorption systems. The first of said systems consists of the boiler-absorber 1 communicating through the pipe 2 with a condenser 3 from which conduit 4 leads to the cooling pocket 5. The condenser continues in branch 6 of the temperature exchanger 6, 16 which branch communicates through conduit 7 with the container 8. The evaporator coil 9 communicates with said container. The second system consists of a boiler 11 communicating through conduit 12 with the condenser 13. From said condenser the conduit 14 extends to the cooling pocket 15. The condenser continues into the other branch 16 of the temperature exchanger 6, 16 which through pipe 17 communicates with container 18. The evaporator coil 10 communicates with container 18. The evaporator coils 9 and 10 preferably surround the ice trays 30 and are also provided with cooling flanges 31. The boiler-absorbers are provided with central pipes 21 and 24 respectively which are surrounded by the cooling pockets 15 and 5 respectively. The pockets are provided with conical flanges 23, 25 between which the solid absorption means 22, 26 are stored. The flanges 23 and 25 should preferably be made of a heat conducting material such as copper. The solid absorption substance may consist of calcium chloride, strontium chloride, silica gel, or other solid absorbing or adsorbing substances or mixtures thereof. The apparatus is operable even with liquid absorption means such as water in combination with a suitable cooling medium, such as ammonia. Also liquid solutions, for example ammonia in solid salts, may be used. The containers 8 and 18 are preferably insulated from each other and from the surroundings. The generator-absorbers 1 and 11 are heated from the heat sources 27 and 28 respectively which in this case are shown as gas burners. The gas burners communicate with a reversing thermostat 32 known per se, to which the gas conduit 33 leads. The reversing thermostat 32 is provided with the bulbs 34 and 35 respectively which control the thermostat 32 so that the gas is brought either to the burner 27 or to the burner 28 whereby the boiler-absorbers 1 and 11 are alternately heated.

The apparatus operates in the following manner. It is assumed that the boiler-absorber 1 has been recently heated and that the refrigerant has been driven out of the absorption material and stored in the evaporator 9 and the container 8. In the second system the greater portion of the refrigerant is stored in the solid absorption substance in the boiler-absorber 11 which is thus saturated with refrigerant. The systems are, however, preferably filled with a certain surplus so that the evaporator coil proper is always filled with liquid refrigerant.

It is now assumed that the heat supply to the boiler-absorber 1 is interrupted and switched by means of thermostat 32 to the boiler-absorber 11. Upon the temperature rise now occurring in the second boiler, refrigerant vapor is liberated from the solid absorption substance which causes an increase of pressure in the system until a pressure corresponding to the condensation temperature is obtained. Condensation will then start in condenser 13 so that liquid refrigerant will be formed. Liquid refrigerant now runs down through conduit 14 into the cooling pocket 15 which is gradually filled therewith. The surplus continues through the temperature exchanger branch 16 and the pipe 17 down to the container 18 in which a storing of liquid refrigerant takes place. The pressure in the second system is equivalent to the condensation temperature and the liquid refrigerant in the cooling pocket 15 will therefore be evaporated anew if it is subjected to a temperature higher than the condensation temperature.

The vapors developed in the cooling pocket 15 rise through the conduit 14 again to the condenser 13 where they are again condensed to a liquid. This condensation will take place mainly in that portion of the condenser which is above the entrance of the conduit 14 therein. The refrigerant once evaporated in the cooling pocket 15 will therefore, upon being condensed, again run down into the cooling pocket 15 which therefore is always supplied with refrigerant. In the cooling pocket 15 evaporation of great quantities of refrigerant may thus take place during one boiling period so that great quantities of heat from the boiler-absorber 1 can be removed during its absorption period.

The cooling pocket 15 will therefore automatically be maintained at a temperature equal to the condensation temperature and causes a rapid cooling of disks 23 and of the solid absorption substance 22 in the boiler 1, and tends to keep these parts at the temperature of the condenser 13.

In order to reduce the volume of the condensate stored in the cooling pocket and to improve the heat transfer between the central pipe and the absorber flanges the cooling pockets should preferably be provided with axial or peripheral ribs 61 which metallicly unite the central pipe and the surrounding pipe to which the flanges are secured.

By this reduction in temperature in the solid absorption substance the pressure in the system is lowered because the vapor is absorbed in the solid absorption material. Hereby the refrigerant in the evaporator 9 is brought to evaporate whereby heat is absorbed, i. e. cold generated. The refrigerant vapors formed pass through the branch 6 in the temperature exchanger and further through condenser 3 and conduit 2 and are absorbed by the absorption substance. Due to the absorption, heat is developed so that the temperature of the absorption material would again rise unless a continuous cooling thereof through the cooling pocket 15 took place. The absorption will on account of this cooling take place at a temperature about equal to the condensation temperature in condenser 13, which latter temperature will vary according to the air temperature in an air cooled type of apparatus or according to the cooling water temperature in a type of apparatus using cooling water. The boiling of the refrigerant in the evaporator will accordingly continue until the absorption substance in the boiler-absorber 1 has been saturated at the prevailing temperature of condenser 13 so that it is not able to absorb any more refrigerant. Meanwhile the expelling of refrigerant from boiler-absorber 11 has continued and the refrigerant will thus at the end of the period be absorbed in the first system in boiler-absorber 1 and in the second system stored in container 18. During the period cooling effect has thus been supplied to parts 30 and 31 through the action of evaporator 9 whereby refrigerant in container 8 has been gradually consumed so that the remaining liquid refrigerant in this system is sufficient to maintain the evaporator coil proper filled. At the same time refrigerant has been stored in container 18 belonging to the second system. During the next period the heat supply is reversed to that boiler-absorber 1 is heated instead of boiler-absorber 11. Hereby cooling of the boiler-absorber 11 is obtained in similar manner as described above by means of the cooling pocket 5 so that cooling effect is derived from the evaporator coil 10. The radiator 30, 31 will therefore always give off cooling effect as the systems start their cooling periods almost immediately after the reversal of the heat supply. During each period one of the systems delivers cooling effect whereas refrigerant is condensed in the container belonging to the other system. The condition at the completion of each period is accordingly identical with the condition at the beginning of each period, only that the systems have exchanged their characteristics.

From this it is understood that simultaneously with the passage of refrigerant vapors through one branch of the temperature changer, warm condensate runs down to the container through the other branch. Hereby a very valuable precooling of this condensate is obtained whereby the losses in the evaporator are substantially eliminated. This exchange of temperature is, however, possible only if condensation in the temperature exchanger proper is prevented in the system which is being heated. This is brought about by enclosing in the apparatus a small quantity of inert gas which during the heating period fills the refrigerant container and the temperature exchanger so that condensation takes place mainly in the condenser. The necessary volume to be occupied by inert gas should be so small that the inert gas pressure during the subsequent cooling period is negligible in relation to the pressure of the refrigerant.

The automatic refrigerator just described may be designed in many different ways. One example is shown in Figure 6. In this figure the boiler-absorber 34 is supposed to have its heating period whereas the boiler-absorber 35 has its absorption period. The cooling system of the latter absorber is shown in the drawings whereas other parts are omitted. When refrigerant is driven out of 34 and condensed in condenser 36 it runs down through the conduit 37 to the lower part of the cooling pocket 38 which in this case is assumed to consists of a pipe coil in metallic contact with the disks on which the absorption medium is stored. From the upper portion of the cooling coil conduit 39 extends to the condenser in the manner shown in the figure. When the absorption proceeds in the boiler-absorber 35 a boiling takes place in the cooling coil 38 in the manner above described and the vapors formed will rise through pipe 39 and are again condensed in condenser 36. The automatic cooling system will therefore in this case consist of a circulation system so that the vapors do not need to pass liquid running down through the same conduit.

There are also dispositions conceivable whereby the refrigerant in the pockets, upon reversing the heat supply, are transferred to the refrigerant container so that the cooling pocket is emptied before the absorption period of the same system has commenced. This can be arranged by disposing supply conduit 37 in relation to the source of heat in such a way that liquid refrigerant is driven over to the refrigerant container. The cooling of the condenser should therefore be so disposed that condensation can also take place at a point between the inlet of the cooling pocket and the refrigerant container. This pumping over of liquid refrigerant from the cooling pocket to the container can be effected, by way of example, by disposing the inlet conduit 37 in a spiral 40 around the central pipe in the boiler before it continues into the cooling coil 38 proper, whereby due to the heat application a thermo-syphon action will take place which transfers the greater portion of the liquid refrigerant contained in the pocket to the extension 41 of the condenser, and further to the refrigerant container.

Figure 3 shows an embodiment of the boiler-absorber and its cooling pocket. The heat source is here assumed to be an electric heating element 42 disposed in the central pipe 43 of the boiler which pipe is surrounded by the cooling pocket 44. To said cooling pocket refrigerant conduit 45 is leading. Said conduit extends from the condenser of the other system. The cooling pocket is in usual manner provided with copper flanges 46 between which the absorbing agent is stored. Said flanges are not in metallic contact with the boiler casing 47. The boiler communicates through pipe 48 with the condenser. The boiler is insulated by means of the insulation 49. By this disposition both heating and cooling takes place from within the central portion of the boiler which portion is in direct heat communication with the copper flanges and thereby with the absorption material. The disks and the absorption material will thus receive heat, respectively cold, ahead of other portions of the boiler, such as the outer shell and the insulation, and will accordingly for each cycle have a higher, respectively lower temperature than the boiler casing. The mean temperature of the insulating mass in relation to the temperature ranges in which the temperature of the absorption material varies, will therefore be comparatively constant whereby heat losses are reduced.

The importance of reducing the volumes of the cooling pockets has been pointed out above. To avoid long conduits extending to the pockets from the condensers, these should preferably be disposed close above the boiler-absorbers. Since appreciable pressures can be disposed for forcing the condensate into the refrigerant containers, it is not necessary to dispose the condensers above the evaporator.

In order to avoid duplication of the cooling surfaces, which are shown for instance in Figure 1, the condensers of the two systems should preferably be built together and adapted to be cooled by the same cooling water pipe or by cooling flanges in common. In Figure 4 a section of such a disposition for a water cooled apparatus is shown, where pipe 57 pertains to one system and pipe 58 to the other system. The cooling water pipe is represented by pipe 59 in section. Preferably all three pipes are soldered or welded together so that a good thermal contact is obtained. The condenser may, of course, consist of coils or spirals in one or more turns.

Figure 5 shows a section of the condenser in an air cooled apparatus. The two condensers are represented by pipes 57 and 58 provided with flanges 60 of a heat conducting material, such as aluminum. There is no drawback to the common cooling of the condensers because the two systems operate alternately and condensation will therefore take place only in one condenser at a time, whereas the other condenser is passed only by comparatively cool refrigerant vapor originating from the evaporator and which passes the condenser without changing its heat content to any considerable degree.

Figure 2 shows an embodiment of the invention with common cooling flanges 62 for both systems and a simplified heat exchanger 71, 72 consisting of extensions from the condenser pipes 73, 74.

As regards the regulating means it is understood from the above that the reversal device in hitherto known intermittent refrigerators for shifting the cooling between the condenser and the boiler-absorber at the end of each period will be entirely superfluous in the present apparatus.

To obtain a semi-continuous cooling effect from the apparatus a periodical reversal of the heat supply from one boiler to the other is all which is required. This is effected by means of a reversing thermostat 67 adapted to shift the supply of gas or electrical energy from one boiler to the other. This reversing thermostat 67 should preferably obtain its impulses from thermostat bulbs 63, 64 disposed one on each boiler-absorber 65, 66. The thermostat should preferably allow only one boiler to be heated at a time. The moment of interruption should be so adjusted that shifting takes place when the temperature in the corresponding boiler-absorber reaches a predetermined limit. This limit can be so chosen that the best possible economy is obtained while at the same time overheating of the absorption material is avoided. The expelling of refrigerant from the absorption agent should be interrupted early enough to prevent such overheating. According to the present invention the heating period for each system may be of the same duration as the cooling period, for which reason the heat supply need not be intense. A comparatively small continuous heat supply will provide a good economy and a good safety against overheating of the absorption material. In electrically operated units, a triple electrode mercury switch is preferably used. Since the temperature difference between the two boiler-absorbers at the end of each period is considerable, a powerful impulse can be obtained from such thermostats so that they should be very reliable in operation.

The cooling effect may be regulated by disposing a thermostat 69 for governing the gas flow through conduit 68, respectively the electricity supply to both systems in common. This thermostat 69, known per se receives its impulses from a sensitive bulb 70 disposed on the evaporators or in the space to be cooled.

The pipes 75, 76 leading from the condensers to the cooling pockets in absorbers 66, 65 are preferably provided with cooling flanges which can be common to both pipes 75, 76 as shown with the condenser pipes 73, 74. The absorber pipes 75, 76 are then, if desired, arranged with a portion substantially horizontal. The provision of the flanges on pipes 75, 76 renders possible an advantageous distribution of the total cooling area.

The cooling derived from the absorber pipe flanges will condense the refrigerant vapor coming from the cooling pocket, the rate of said vapor flow being related to the heat liberated in the absorber. If the cooling effect of the absorber pipe flanges is insufficient to condense all of said vapor the remaining portion will be condensed in and returned from the condenser as previously described.

I claim:—

1. In a combination, two intermittent absorption refrigerating systems, each comprising a boiler-absorber, a condenser, and an evaporator, each boiler-absorber having a fluid collector, and a communication between each fluid collector and the condenser of the other system.

2. In a combination, two intermittent absorption refrigerating systems, each comprising a boiler-absorber, a condenser, and an evaporator, cooling means associated with each of the boiler-absorbers, and a conduit connecting each of the condensers with the cooling means of the boiler-absorber of the other system.

3. In a combination, two intermittent absorption refrigerating systems, each comprising a boiler-absorber, a condenser, and an evaporator, each of the condensers having a pocket, each boiler being adapted to be cooled by means of a hollow member, and a communication between each of said pockets and the hollow member of the other system.

4. In a combination, two intermittent absorption refrigerating systems, each comprising a boiler-absorber, a condenser, and an evaporator, the boiler-absorbers having a central tube adapted for heating which has an extension, a hollow member in metallic contact with one of the boiler-absorbers and with the extension and connected to the condenser of the other system.

5. In a combination, two intermittent absorption refrigerating systems, each comprising a generator-absorber, a condenser, and an evaporator, each generator-absorber having a fluid collector, and a communication between each fluid collector and the condenser of the other system.

In testimony whereof I affix my signature.

THORE MARTIN ELFVING.